(12) United States Patent
Chen

(10) Patent No.: US 9,931,544 B2
(45) Date of Patent: Apr. 3, 2018

(54) BALL BAG STAND AND BALL BAG ENGAGEMENT STRUCTURE

(71) Applicant: Benjamin Chen, Taichung (TW)

(72) Inventor: Benjamin Chen, Taichung (TW)

(*) Notice: Subject to any disclaimer, the term of this patent is extended or adjusted under 35 U.S.C. 154(b) by 154 days.

(21) Appl. No.: 14/722,185

(22) Filed: May 27, 2015

(65) Prior Publication Data

US 2016/0346629 A1   Dec. 1, 2016

(51) Int. Cl.
| A63B 47/00 | (2006.01) |
| B65D 33/16 | (2006.01) |
| B62B 3/00 | (2006.01) |
| A63B 71/02 | (2006.01) |

(52) U.S. Cl.
CPC ............... *A63B 47/00* (2013.01); *B62B 3/00* (2013.01); *B65D 33/16* (2013.01); *A63B 2071/025* (2013.01); *A63B 2210/50* (2013.01)

(58) Field of Classification Search
CPC ............. A63B 47/00; A63B 2071/025; A63B 2210/50; B62B 3/00; B65D 33/16
See application file for complete search history.

(56) References Cited

U.S. PATENT DOCUMENTS

| 593,346 | A | * | 11/1897 | Baehn | B65D 33/14 |
| | | | | | 206/278 |
| 2,300,342 | A | * | 10/1942 | Cheney | A41F 11/04 |
| | | | | | 24/465 |
| 2,723,435 | A | * | 11/1955 | Batzdorff | A41F 11/04 |
| | | | | | 24/478 |
| 4,305,171 | A | * | 12/1981 | Pettersson | F16B 21/071 |
| | | | | | 114/343 |
| 5,897,012 | A | * | 4/1999 | Sortwell | B65D 19/12 |
| | | | | | 206/600 |
| 6,431,386 | B1 | * | 8/2002 | Hofman | A47K 3/281 |
| | | | | | 220/481 |
| 9,421,427 | B2 | * | 8/2016 | Chen | A63B 47/00 |
| 2006/0032992 | A1 | * | 2/2006 | Rosheuvel | B65F 1/062 |
| | | | | | 248/97 |
| 2006/0175475 | A1 | * | 8/2006 | Desantis | B65B 67/12 |
| | | | | | 248/99 |

FOREIGN PATENT DOCUMENTS

TW          M466562 U       12/2013

* cited by examiner

*Primary Examiner* — Tri Mai
(74) *Attorney, Agent, or Firm* — Alan D. Kamrath; Kamrath IP Lawfirm, P.A.

(57) ABSTRACT

A ball bag stand and ball bag engagement structure includes a ball bag stand structure, a ball bag structure, protrudingly engaging structures, and cords. The protrudingly engaging structures each have a vertically smooth action force-free surface and an action force-applied surface with a protruding flange. A user can lift the ball bag by lifting the cords between the ball bag and the ball bag stand with one finger of the user single-handedly to thereby not only allow the action force-free surfaces of the fastening holes to press against the vertical smooth surface while sliding relative thereto, but also allow the action force-applied surfaces of the fastening holes to move away from the protruding flanges. Hence, the cords can be moved away from the protrudingly engaging structures with one finger of the user single-handedly, so that the user can remove the ball bag from the ball bag stand easily.

6 Claims, 10 Drawing Sheets

BALL BAG STAND AND BALL BAG ENGAGEMENT STRUCTURE

BACKGROUND OF THE INVENTION

1. Technical Field

The present invention relates to the field of ball bag stands and, more particularly, to a ball bag stand and ball bag engagement structure which allows a ball bag in use to be fixed to a ball bag stand by protrudingly engaging structures and protruding flanges and which allows ball bag cords to move away from the protrudingly engaging structures with one finger of a user single-handedly because of vertical smooth surfaces of the protrudingly engaging structures, such that the ball bag when not in use can be removed from the ball bag stand quickly.

2. Description of Related Art

Referring to FIG. 1, a conventional snap-engagement structure 10 is peripherally or circumferentially provided with a flange 11 and thus has a drawback described below. Cord fastening holes 14 disposed at a ball bag 13 engage with the flanges 11, respectively, in an increasingly tight-fitting manner while balls 12 are consecutively put in the ball bag 13. If a user lifts the ball bag 13, the cord fastening holes 14 will be stopped and intercepted by the flanges 11. In practice, the user has to grip a ball bag stand 15 by one hand and align the cord fastening holes 14 with the flanges 11, respectively, by the other hand such that the cord fastening holes 14 can separate from the flanges 11, thereby removing the ball bag 13 from the ball bag stand 15. However, the aforesaid process not only takes much time but must also be carried out inconveniently by both hands. As a result, upon completion of ball games, players find it inconvenient and annoying to lift the ball bag 13 due to the conventional snap-engagement structure 10.

SUMMARY OF THE INVENTION

It is an objective of the present invention to provide a ball bag stand and ball bag engagement structure which allows a ball bag in use to be fixed to a ball bag stand by protrudingly engaging structures and protruding flanges and which allows ball bag cords to move away from the protrudingly engaging structures with one finger of a user single-handedly because of vertical smooth surfaces of the protrudingly engaging structures such that the ball bag when not in use can be removed from the ball bag stand quickly.

In order to achieve the above and other objectives, the present invention provides a ball bag stand and ball bag engagement structure, comprising: a ball bag stand structure, a ball bag structure and a plurality of protrudingly engaging structures. An action force-free surface of each of the protrudingly engaging structures has a vertical smooth surface. An action force-applied surface of each of the protrudingly engaging structures has a protruding flange. The ball bag sags while the number of balls in the ball bag is increasing, and, thus, the ball bag pulls the cords to thereby not only allow the action force-applied surfaces of the fastening holes to press against the action force-applied surfaces of the protrudingly engaging structures, respectively, but also allow the protruding flanges of the action force-applied surfaces of the protrudingly engaging structures to abut against and intercept the action force-applied surfaces of the fastening holes. Upon completion of a ball game, a player can lift the ball bag when not in use by lifting the cords between the ball bag and the ball bag stand structure with one finger of the player single-handedly to thereby not only allow the action force-free surfaces of the fastening holes to press against the vertical smooth surface while sliding relative thereto, but also allow the action force-applied surfaces of the fastening holes to move away from the protruding flanges, respectively. Hence, the user can move the cords away from the protrudingly engaging structures with one finger of the user single-handedly such that the ball bag can be snap-engagingly mounted on and dismounted from the ball bag stand structure with one finger of the user single-handedly and easily. Therefore, in the eyes of players, a ball bag stand and ball bag engagement structure of the present invention allows balls to be collected and conveyed easily and thus manifests novelty and non-obviousness.

DETAILED DESCRIPTION OF THE EMBODIMENTS OF THE INVENTION

Figure 1:
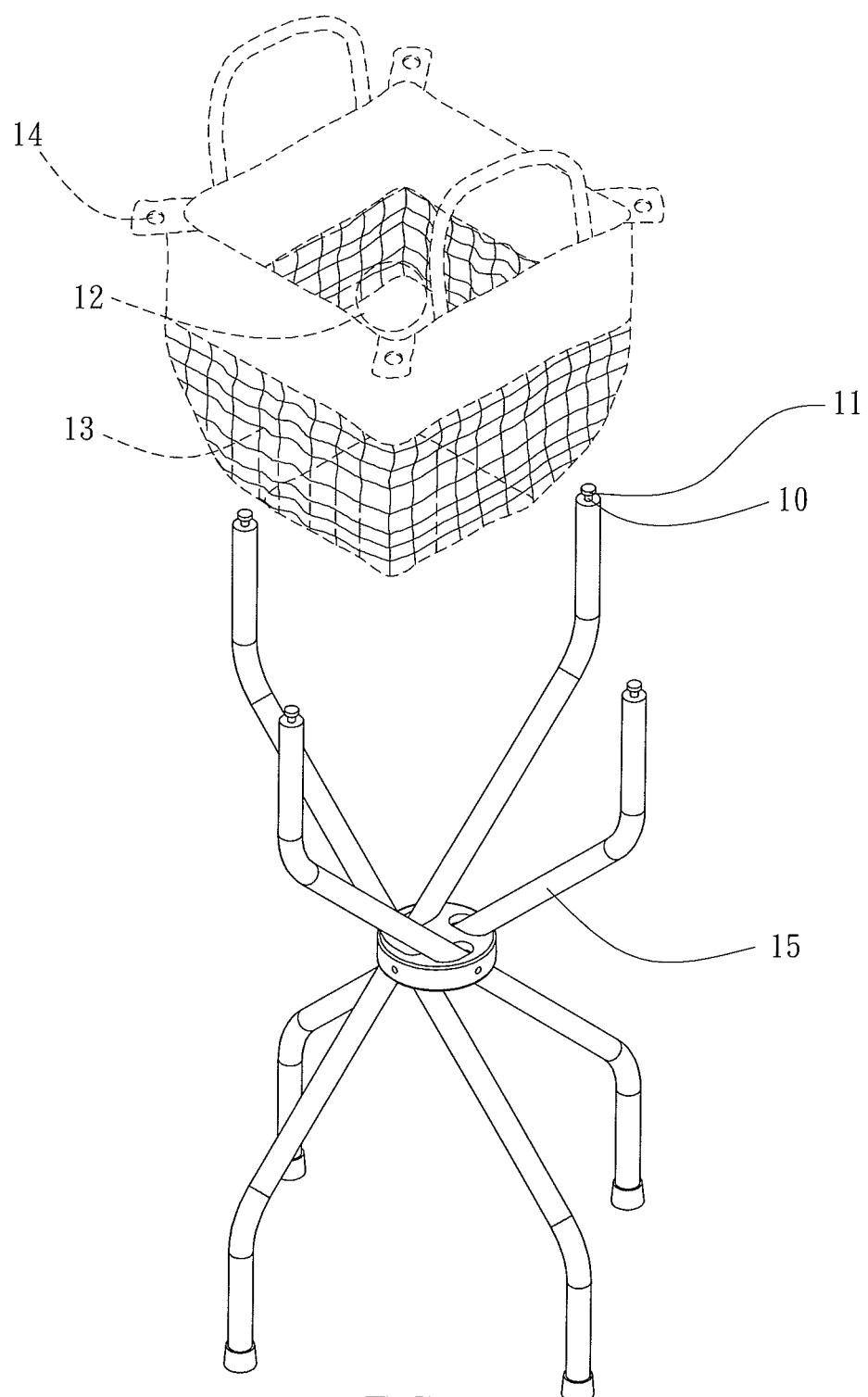
FIG. 1 (PRIOR ART) is a perspective view of a conventional snap-engagement structure for use with a ball bag stand.
Figure 2:
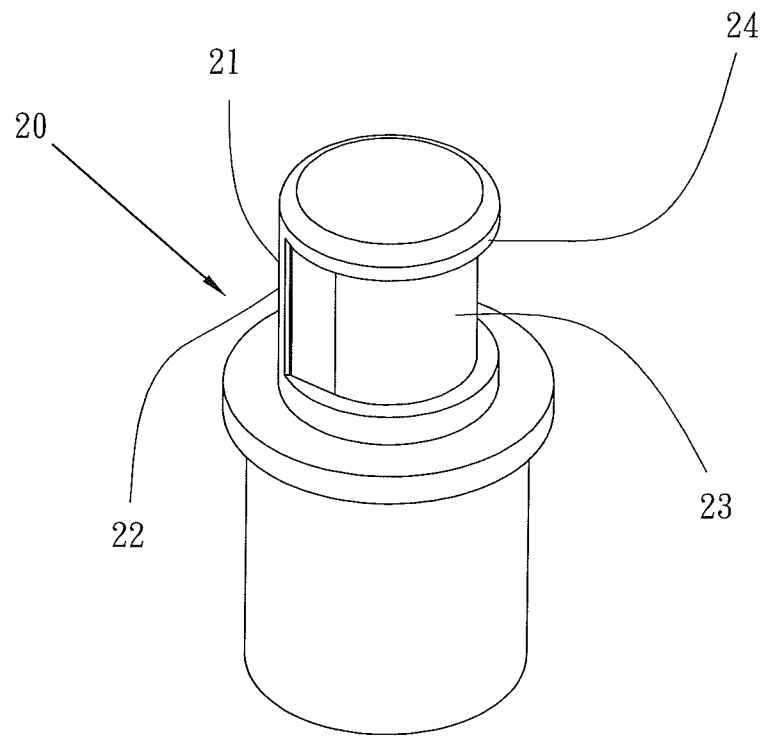
FIG. 2 is a schematic perspective view of a protrudingly engaging structure according to an embodiment of the present invention.
Figure 3:
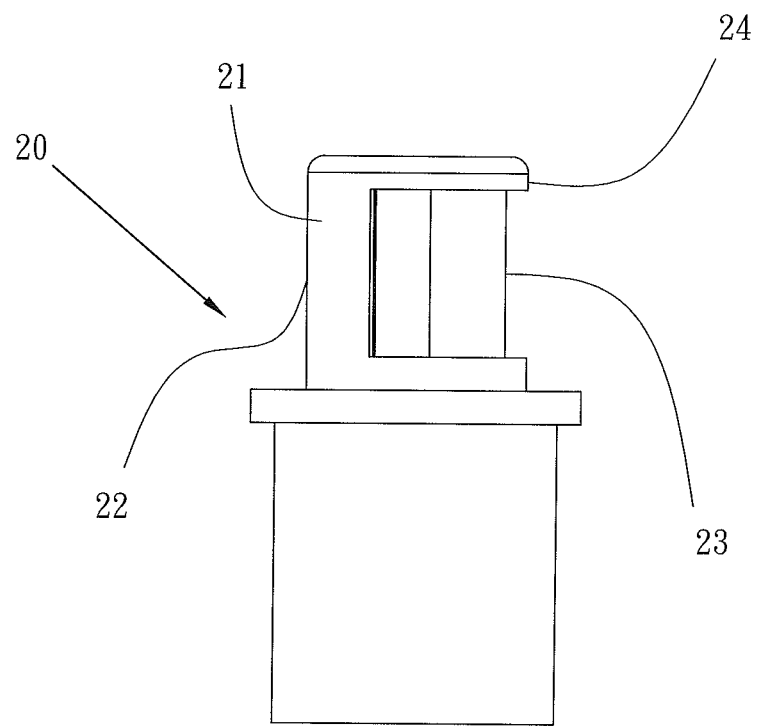
FIG. 3 is a schematic side view of the protrudingly engaging structure according to the embodiment of the present invention.
Figure 4:
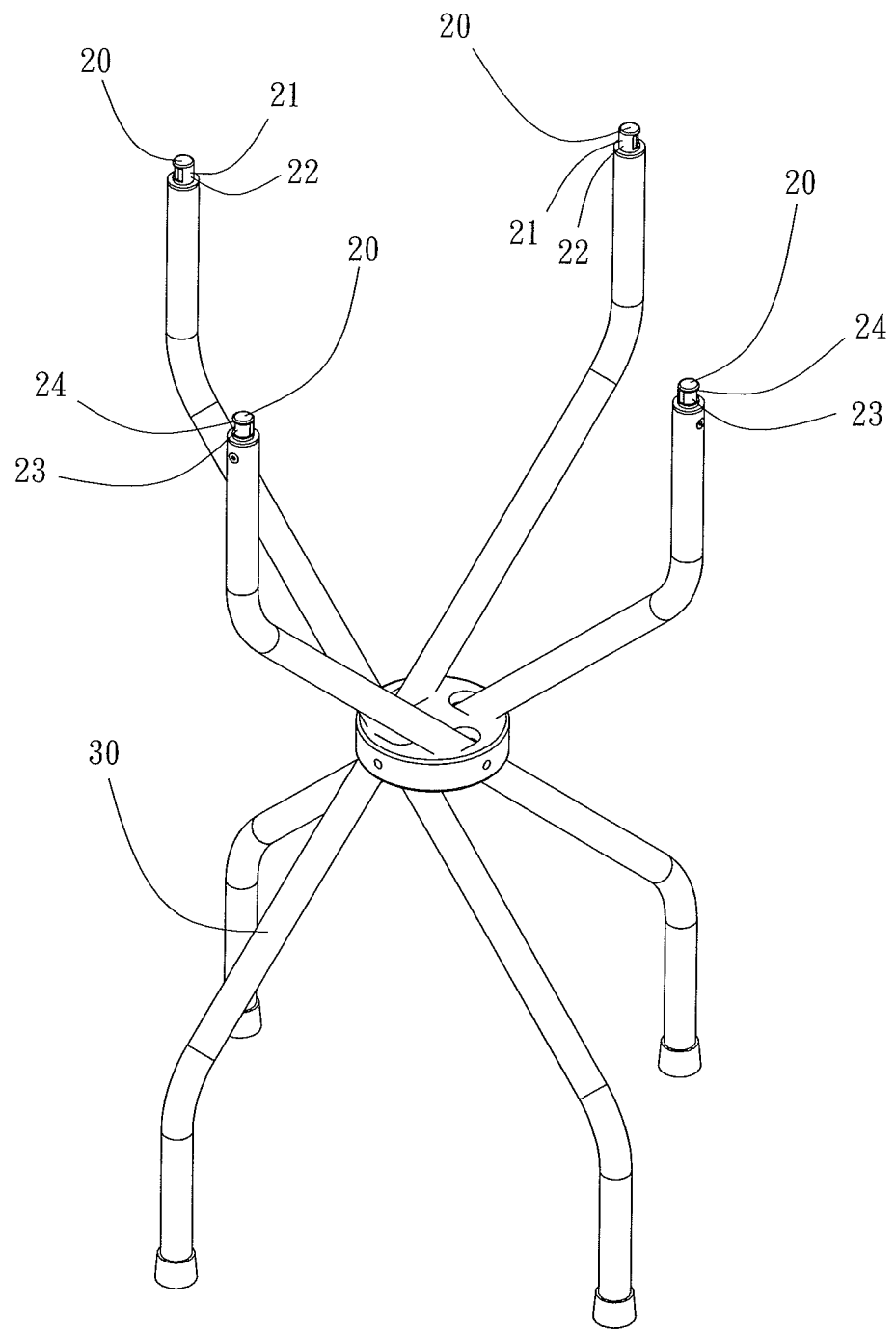
FIG. 4 is a schematic perspective view of the protrudingly engaging structures for use with a ball bag stand according to the embodiment of the present invention.
Figure 5:
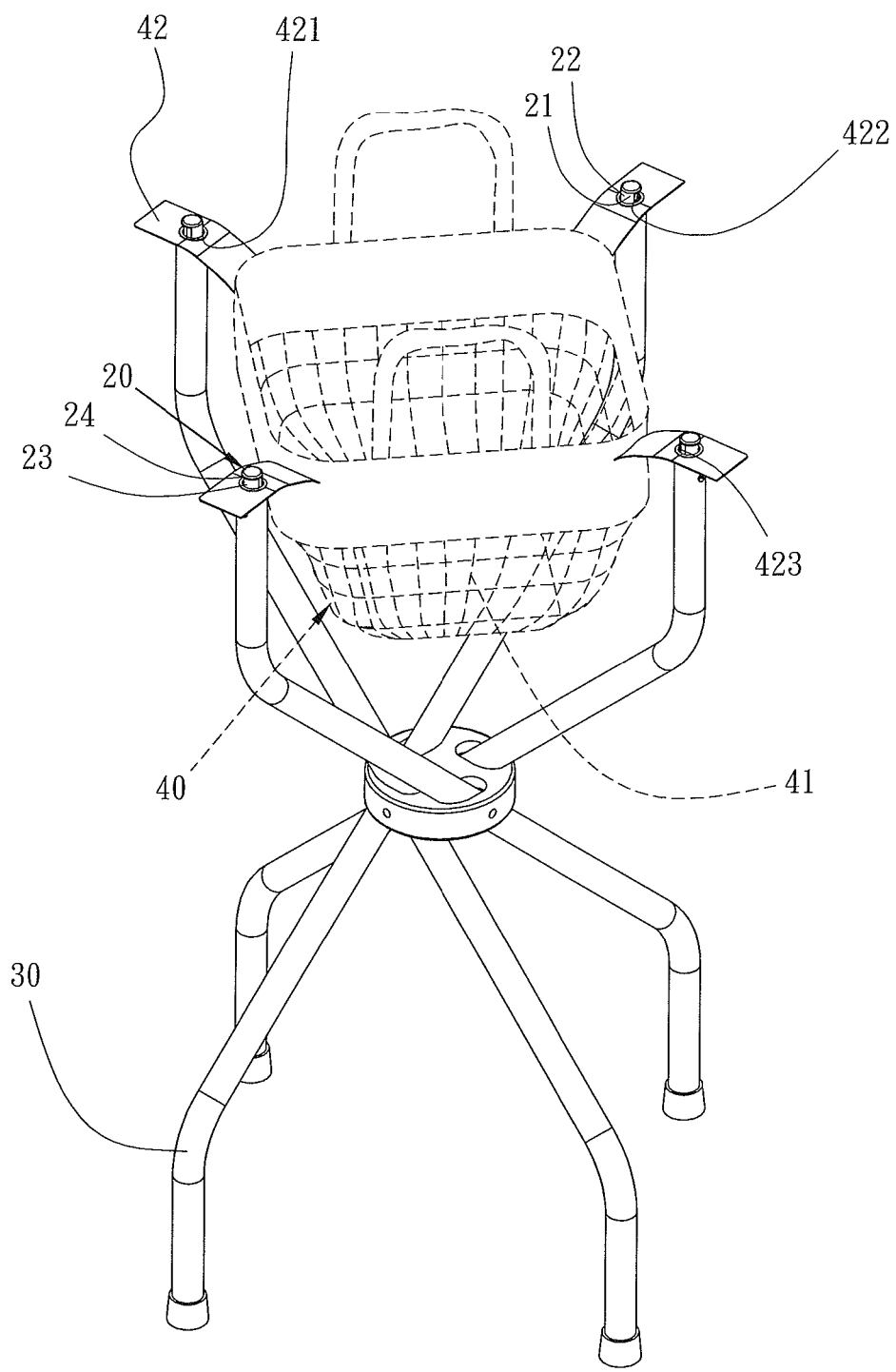
FIG. 5 is a schematic perspective view of the protrudingly engaging structures for use with the ball bag stand and a ball bag mounted thereon according to the embodiment of the present invention.
Figure 6:
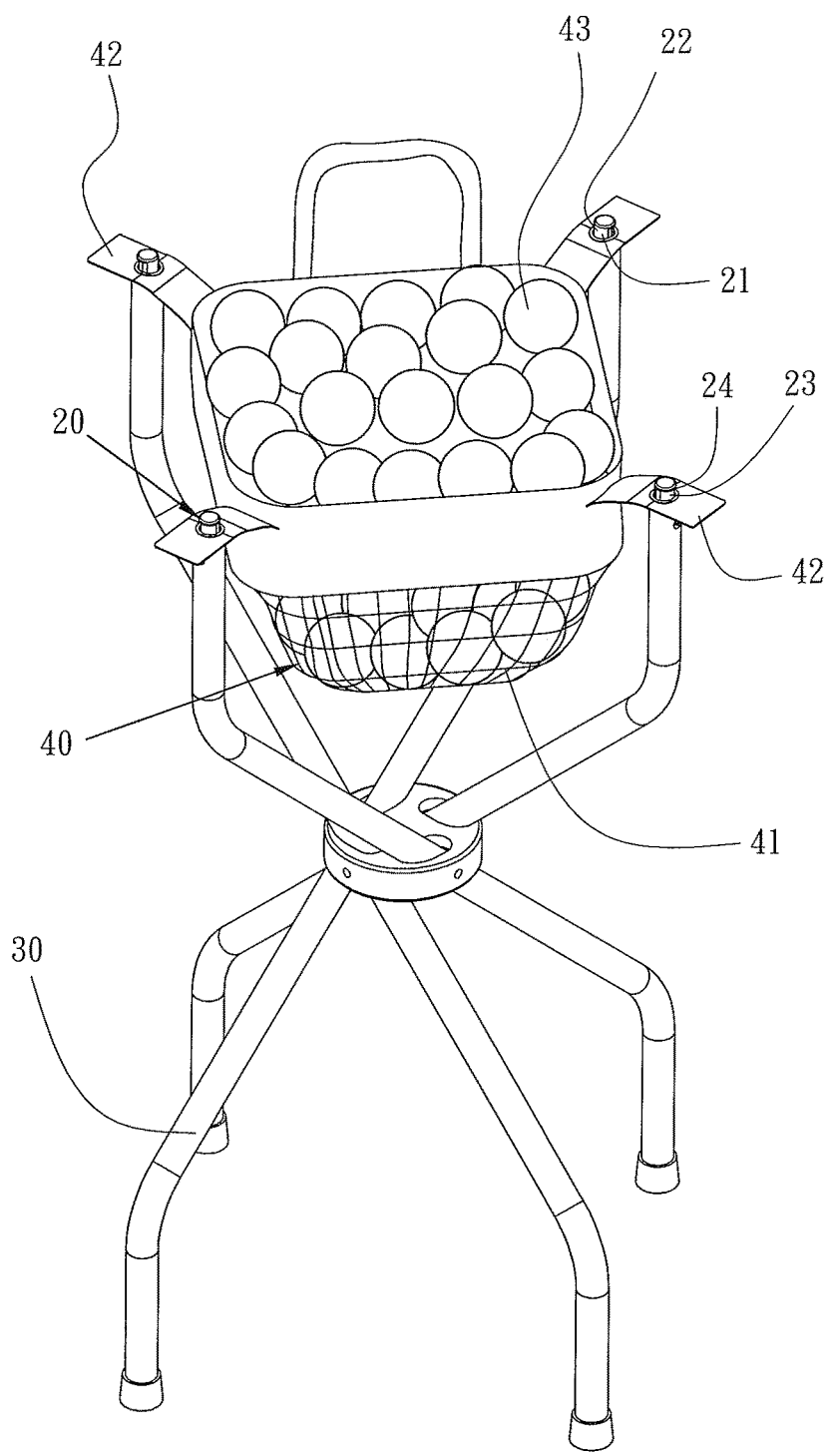
FIG. 6 is a schematic perspective view of the protrudingly engaging structures for use with the ball bag stand, with the ball bag mounted thereon and filled with balls, according to the embodiment of the present invention.

Referring to FIG. 2 through FIG. 10, the present invention provides a ball bag stand and ball bag engagement structure which comprises a plurality of protrudingly engaging structures 20 and a ball bag structure 40.

The protrudingly engaging structures 20 are each formed integrally with or coupled to a ball bag stand structure 30.

The protrudingly engaging structures 20 each have an action force-free surface 21 with a vertical smooth surface 22. Furthermore, the protrudingly engaging structures 20 each have an action force-applied surface 23 with a protruding flange 24 which protrudes laterally.

The ball bag structure 40 comprises a ball bag 41 and a plurality of cords 42. The cords 42 are disposed at the periphery of the ball bag 41, and each have a fastening hole 421. The inner diameter of the fastening holes 421 is slightly larger than the outer diameter of the protrudingly engaging structures 20. The fastening holes 421 can be snap-engaged with the protrudingly engaging structures 20, respectively. The fastening holes 421 are shifted under the weight of the ball bag 41 and the weight of balls 43 to thereby allow an action force-applied surface 422 of each of the fastening holes 421 to press against the action force-applied surface 23 of a corresponding one of the protrudingly engaging structures 20, and in consequence, the fastening holes 421 are stopped by the protruding flanges 24 and thus cannot escape from the protrudingly engaging structures 20. To remove the ball bag 41, a user only needs to lift the cords 42 with one finger of the user single-handedly, such that not only does an action force-free surface 423 of each of the fastening holes 421 press against and slide upward relative to the vertical smooth surface 22 of a corresponding one of the protrudingly engaging structures 20, but the action force-applied surfaces 422 of the fastening holes 421 also move away from the protruding flanges 24 to thereby disconnect from the protrudingly engaging structures 20, respectively. Hence, the ball bag 41 can be snap-engagingly mounted on and dismounted from the ball bag stand structure 30 with one finger of a user single-handedly and easily.

The ball bag stand and ball bag engagement structure is characterized in that the protrudingly engaging structures 20 are in the number of at least three.

The ball bag stand and ball bag engagement structure is characterized in that the protrudingly engaging structures 20 are preferably in the number of four.

Figure 7:
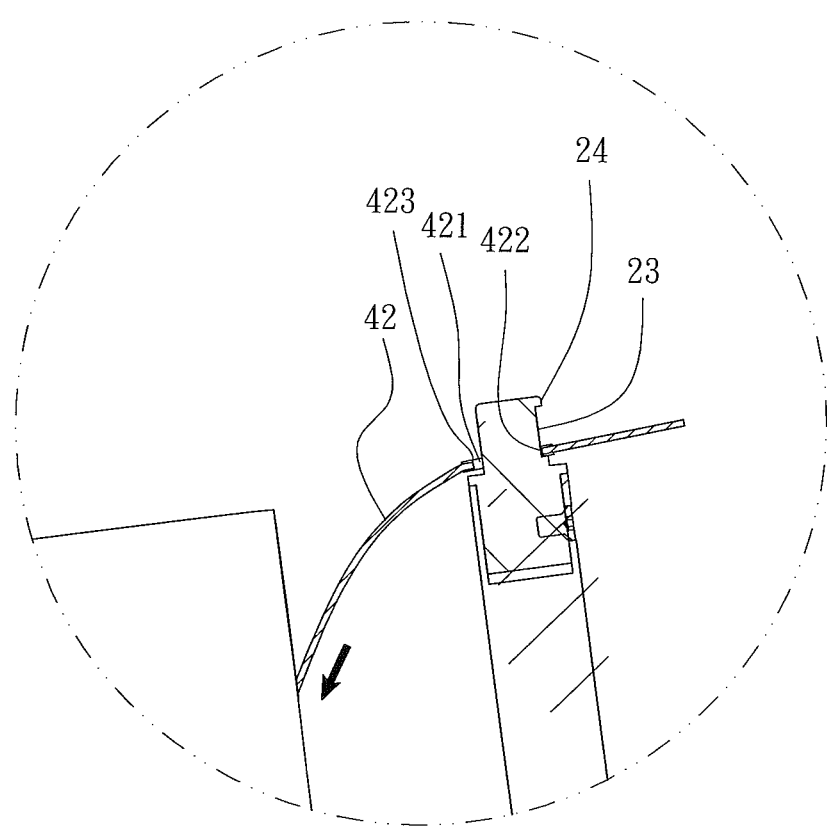
FIG. 7 is a cross-sectional view of a cord pulled under the weight of the ball bag or the weight of the ball bag and balls such that an action force-applied surface of a cord fastening hole presses against an action force-applied surface of a protrudingly engaging structure according to the embodiment of the present invention.
Figure 8:
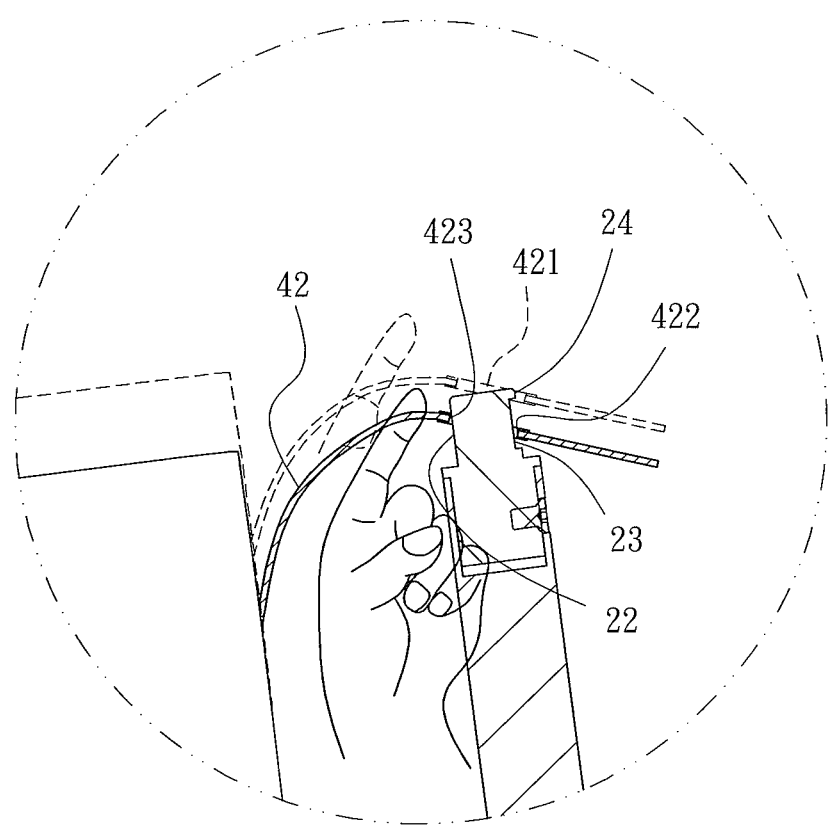
FIG. 8 is a schematic view which shows that the cord is manipulated with one finger of a user single-handedly to cause the action force-free surface of the cord fastening hole to slide upward while pressing against a vertical smooth surface of the protrudingly engaging structure according to the embodiment of the present invention.
Figure 9:
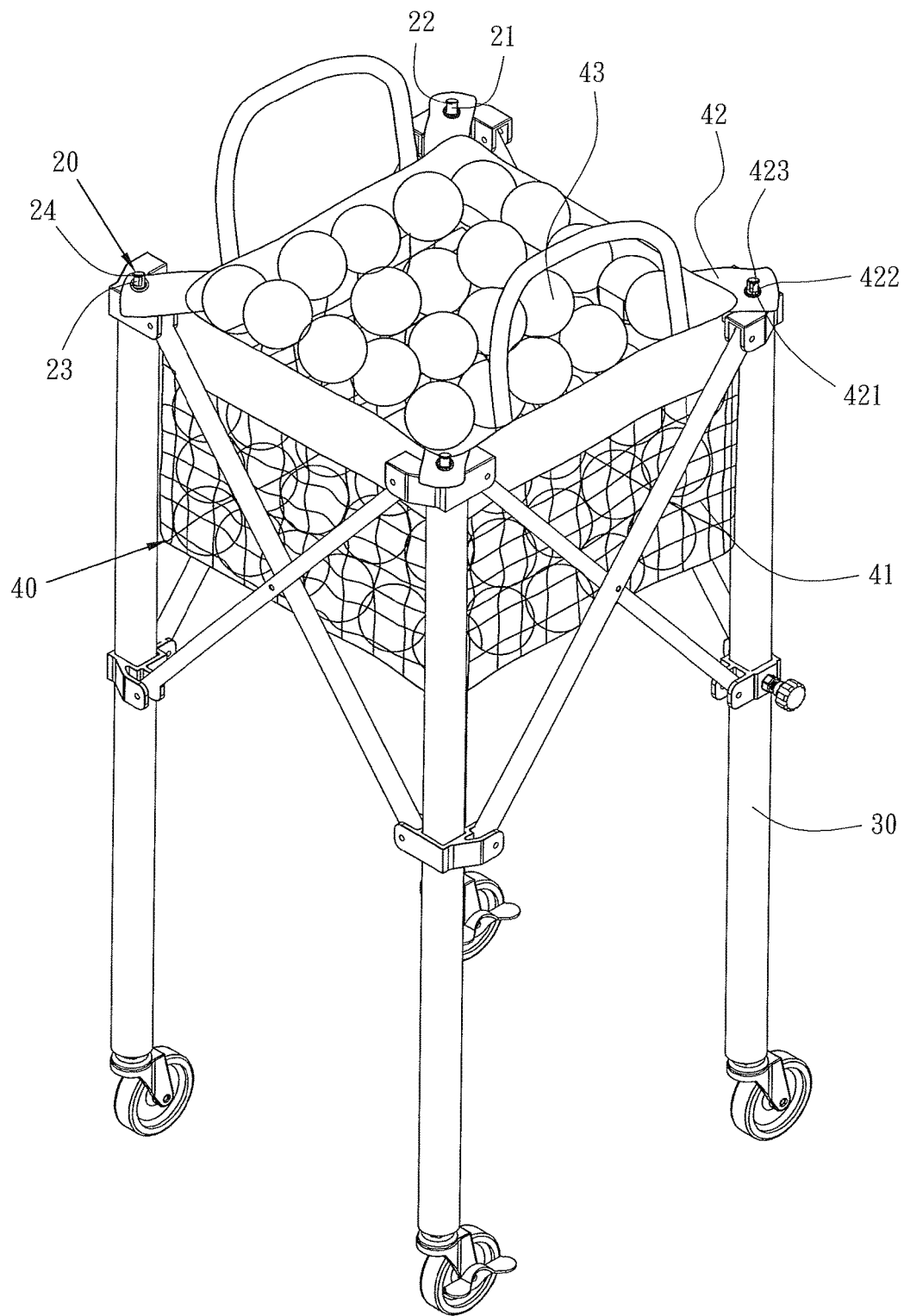
FIG. 9 is a schematic perspective view of the protrudingly engaging structures for use with the ball bag stand, the ball bag mounted thereon and filled with balls according to another embodiment of the present invention.
Figure 10:
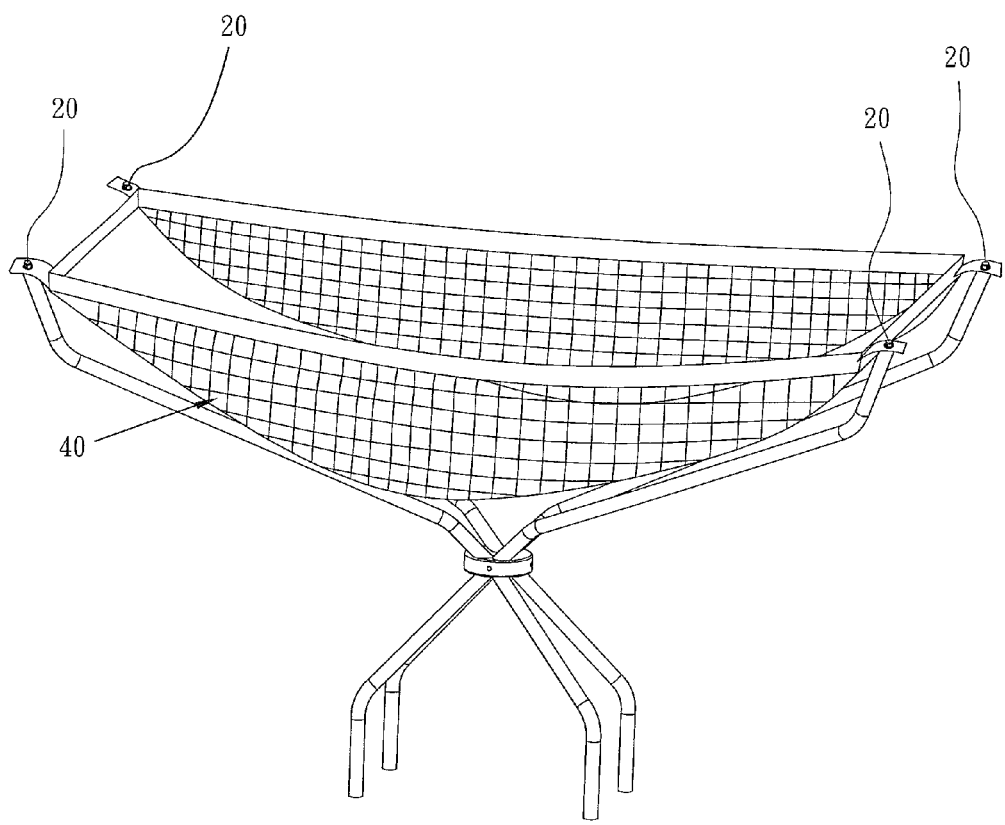
FIG. 10 is a schematic perspective view of the protrudingly engaging structures for use with the ball bag stand and the ball bag mounted thereon according to yet another embodiment of the present invention.

The present invention provides a ball bag stand and ball bag engagement structure which comprises the ball bag stand structure 30, the ball bag structure 40 and the plurality of protrudingly engaging structures 20. The action force-free surface 21 of each of the protrudingly engaging structures 20 has the vertical smooth surface 22. The action force-applied surface 23 of each of the protrudingly engaging structures 20 has the protruding flange 24. The ball bag 41 sags while the number of balls 43 in the ball bag 41 is increasing, and, thus, the ball bag 41 pulls the cords 42 to thereby not only allow the action force-applied surfaces 422 of the fastening holes 421 to press against the action force-applied surfaces 23 of the protrudingly engaging structures 20, respectively, but also allow the protruding flanges 24 of the action force-applied surfaces 23 of the protrudingly engaging structures 20 to abut against and intercept the action force-applied surfaces 422 of the fastening holes 421 (as shown in FIG. 7). Hence, the ball bag 41 in use can be fixed to the ball bag stand structure 30. Furthermore, upon completion of a ball game, a player can lift the ball bag 41 not in use by lifting the cords 42 between the ball bag 41 and the ball bag stand structure 30 with one finger of the player single-handedly (as shown in FIG. 8) to thereby not only allow the action force-free surfaces 423 of the fastening holes 421 to press against the vertical smooth surface 22 while sliding relative thereto, but also allow the action force-applied surfaces 422 of the fastening holes 421 to move away from the protruding flanges 24, respectively. Hence, the cords 42 can be moved away from the protrudingly engaging structures 20 with one finger of the player single-handedly, thereby allowing the player to lift the ball bag 41 from the ball bag stand structure 30 easily. Therefore, in the eyes of players, a ball bag stand and ball bag engagement structure of the present invention allows balls to be collected and conveyed easily and thus manifests novelty and non-obviousness.

Accordingly, given its protrudingly engaging structures and protruding flanges, a ball bag in use can be fixed to a ball bag stand. When the ball bag is not in use, vertical smooth surfaces of the protrudingly engaging structures enable the cords to be moved away from the protrudingly engaging structures with one finger of a user single-handedly to remove the ball bag from the ball bag stand quickly, thereby having high industrial applicability.

What is claimed is:

1. A ball bag stand and ball bag engagement structure, comprising:

a ball bag stand structure including a plurality of vertical posts circumferentially spaced from each other, wherein each vertical post has a first end face and a second end face opposite to each other, with the first end face configured to rest on a support surface, with the second end face having an outer periphery;

a plurality of protrudingly engaging structures coupled to and extending vertically from the second end faces of the plurality of vertical posts of the ball bag stand structure away from the first end faces, with each protrudingly engaging structure having a vertically smooth action force-free surface on a radially inward side of a corresponding one of the plurality of vertical posts and an action force-applied surface on a radially outward side of the corresponding one of the plurality of posts and opposite to the smooth action force-free surface, with the smooth action force-free surface and the action force-applied surface defining an annular periphery, with the annular periphery being smaller than, within and spaced from the outer periphery, with the smooth action force-free surface being arcuate having a diameter, with the action force-applied surface being arcuate having a diameter smaller than the diameter of the action force-free surface, with each protrudingly engaging structure terminating in a laterally protruding flange, with the action force-free and force-applied surfaces being intermediate the laterally protruding flange and the second end face of the corresponding one of the plurality of vertical posts, with the laterally protruding flange extending radially outward beyond the action force-applied surface; and a ball bag structure comprising a ball bag and a plurality of cords extending radially outwardly and circumferentially disposed at a periphery of the ball bag, wherein the plurality of cords each have a fastening hole, wherein an inner diameter of the fastening holes of the plurality of cords is slightly larger than an outer diameter of the plurality of protrudingly engaging structures, with the fastening holes of the plurality of cords snap-engaged with the plurality of protrudingly engaging structures, wherein the smooth action force-free surface is intermediate the ball bag and the action force-applied structure, wherein the fastening holes shifted radially inward of the plurality of vertical posts under a weight of the ball bag allow an action force-applied surface of each of the fastening holes to press against the action force-applied surface of a corresponding one of the plurality of protrudingly engaging structures, wherein the fastening holes are axially stopped by the laterally protruding flanges of the plurality of protrudingly engaging structures and cannot escape from the plurality of protrudingly engaging structures, wherein one of the plurality of cords is lifted with one finger of a user single-handedly with a corresponding one of the fastening hole pressing against and sliding upward relative to the vertically smooth action force-free surface of a corresponding one of the protrudingly engaging structures and with the corresponding one of the fastening holes moving away from the protruding flanges to thereby disconnect from the corresponding one of protrudingly engaging structures, respectively, to remove the ball bag, wherein the ball bag is snap-engagingly mounted on and dismounted from the ball bag stand structure with the one finger of the user single-handedly and easily.

2. The ball bag stand and ball bag engagement structure of claim 1, wherein the plurality of protrudingly engaging structures is in a number of at least three.

3. The ball bag stand and ball bag engagement structure of claim 2, wherein the plurality of protrudingly engaging structures is in a number of four.

4. The ball bag stand and ball bag engagement structure of claim 1, wherein the plurality of protrudingly engaging structures is formed integrally with the plurality of vertical posts of the ball bag stand structure.

5. The ball bag stand and ball bag engagement structure of claim 4, wherein the plurality of protrudingly engaging structures is in a number of at least three.

6. The ball bag stand and ball bag engagement structure of claim 5, wherein the plurality of protrudingly engaging structures is in a number of four.

* * * * *